United States Patent [19]

Boudeville

[11] 4,403,209

[45] Sep. 6, 1983

[54] CARBURANT CONSUMPTION INDICATOR DEVICE FOR AUTOMOBILES

[75] Inventor: Jean-Claude Boudeville, Guyancourt, France

[73] Assignee: Regie Nationale des Usines Renault, Boulogne-Billancourt, France

[21] Appl. No.: 217,190

[22] Filed: Dec. 16, 1980

[30] Foreign Application Priority Data

Jan. 3, 1980 [FR] France .................................. 80 0053

[51] Int. Cl.³ .............................................. G08B 21/00
[52] U.S. Cl. ................................ 340/52 R; 340/52 D; 340/66; 340/669
[58] Field of Search ................. 340/52 R, 52 F, 52 D, 340/53, 66, 79, 669

[56] References Cited

U.S. PATENT DOCUMENTS 4,280,358  7/1981  Henderson .......................... 340/52 R

FOREIGN PATENT DOCUMENTS 1113984 of 0000 France .
2369117 of 0000 France .

*Primary Examiner*—John W. Caldwell, Sr.
*Assistant Examiner*—Joseph E. Nowicki
*Attorney, Agent, or Firm*—Oblon, Fisher, Spivak, McClelland & Maier

[57] ABSTRACT

Carburant consumption indicator device for automobiles which monitors such information as the motor operating conditions, the selected gear ratio and the degree of gas butterfly valve opening which is characterized by several signal elements to each being separately disposed on the vehicle dash board and capable of informing the driver of the above information with the information detected and processed in known electronic circuits and then being processed in an interface circuit with several logic gates (69, 75, 83) which monitor the computational priorities between the information received before being sent to the control circuits (7) of the signal elements.

5 Claims, 5 Drawing Figures

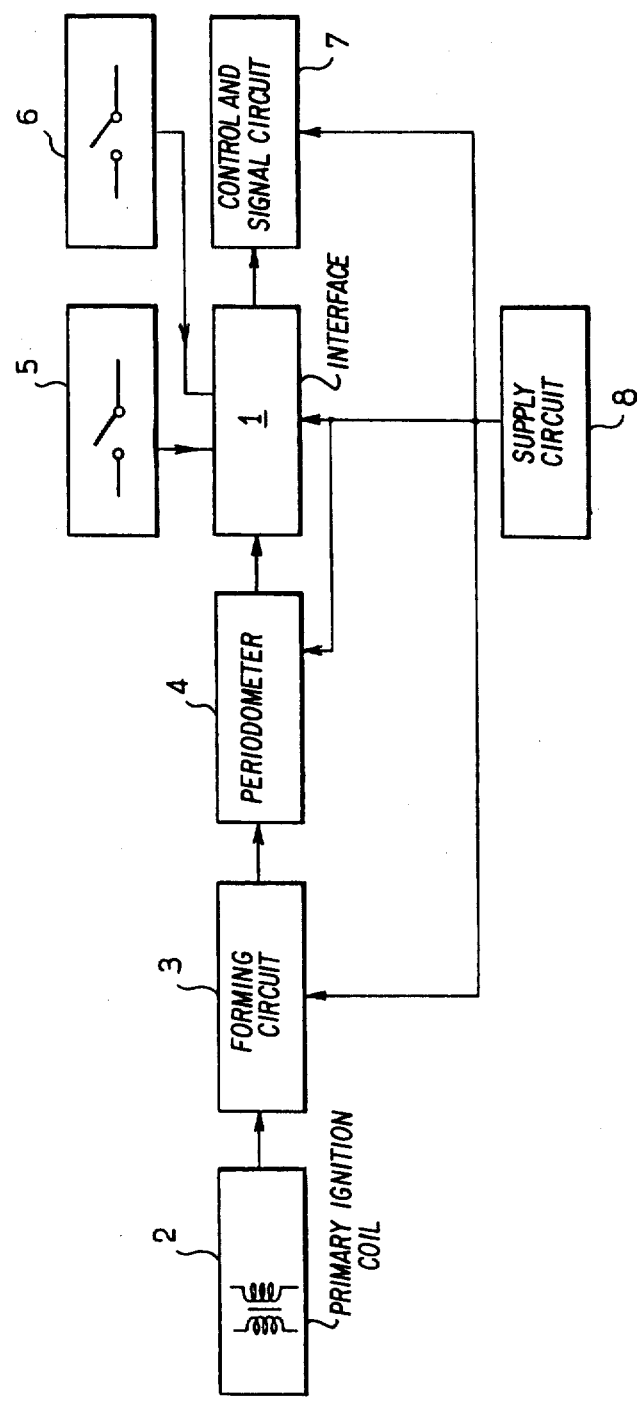
FIG_1

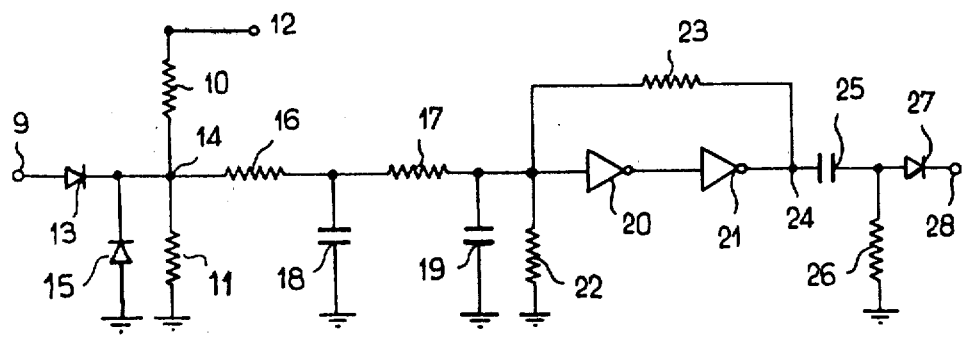
FIG_2
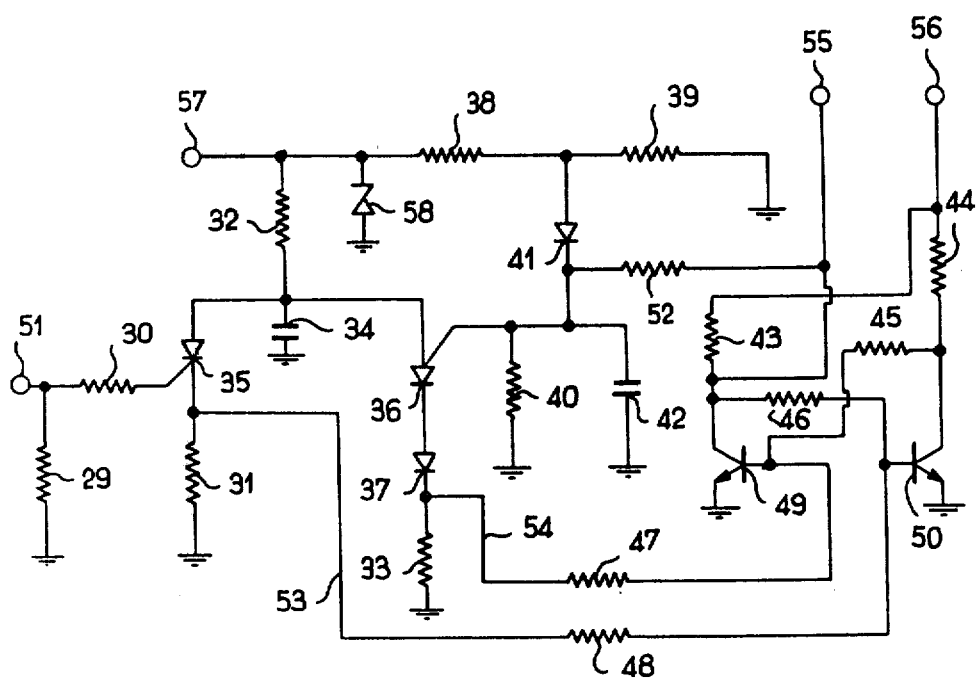
FIG_3

CARBURANT CONSUMPTION INDICATOR DEVICE FOR AUTOMOBILES

BACKGROUND OF THE INVENTION

1. Field of the Invention

The present invention, relates to a device designed to show the driver at any time whether the vehicle is operating economically or not.

2. Description of the Prior Art

Among the known devices which function similar to the present invention and are commercially available are those known devices which measure the vacuum in the motor inlet manifold. But this measurement lacks precision and the readout is difficult to interpret.

Those economizers that are attached to the carburetor are not adaptable to the new fuel injected motors. Thus, they are of interest for only one category of vehicles, i.e. carburated vehicles.

Measurement and indication devices which measure the consumption of carburant are known. These sample several variables such as the speed of the motor or of the vehicle, the gas butterfly valve opening and the selected gear ratio. But these are instruments which give a composite indication of the consumption calculated as an aggregate of the preceding information to be displayed on the dash board in a numerical or analog form. In other words these indicators inform the driver of the average instantaneous consumption, but do not give precise indications as to the time of and cause for overconsumption and the means necessary to remedy such situations.

In effect when a measurement instrument gives quantitative information more precise than a simple alarm signal, the driver is not able to see or can only poorly interpret the many instrument readings, as he is preoccupied with driving the vehicle.

SUMMARY OF THE INVENTION

The object of the present invention is to lessen the inconvenience of known devices and to produce a device which is at once precise, complete and practical to use, which informs the driver immediately by means of various alarms to indicate whether or not his vehicle is operating economically. Each alarm or signal element gives a signal which clearly indicates the cause of overconsumption and the means of correcting it.

Moreover, the device according to the invention may be equally well mounted on all types of vehicles, whether classically carburated or fuel injected.

Thus, the present invention has as its object a carburant consumption indicator device for automobiles which monitors such information as the motor operating conditions, the gear ratio and the degree of gas butterfly valve opening and is characterized by several signal elements each being separately disposed on the vehicle dash board and capable of informing the driver of the above information. Information detected and processed in the known electronic circuits is then processed in an interface circuit with several logic gates which determine the priorities among the information received before being sent to the control circuits of the signal elements.

Preferably, the signal elements are luminous indicator lights with different colors respectively being effected by each information source. But it may just as well be realized in the form of audible alarms with different signal tones made possible by a modification of the control circuits within the ability of a person of average skill in the art.

Therefore, in the following descriptive examples the interface circuit receives three types of information:

1-Logial information about the operating conditions of the motor which is derived from the signal period detected from the primary ignition coil and then sent in this form to an input circuit which is a modification of a known circuit and is described in a previous French patent application and published with the No. 2 268 268. More precisely, this reference concerns a rectangular signal generator circuit followed by differentiation and suppression of the negative polarity. After being processed, the period of the resulting signal is compared to a reference period produced by a comparison generator called a periodometer associated with a trigger generator and with a magnetic log (hysteresis) control, each of which are circuits known from another French application previously submitted under the No. 79/19 104, by the present applicant. Generally, the logical information at the output of the periodometer changes state when the measured period is less than the reference period and corresponds to motor operating conditions which are too rapid. 2-Logical information provided by a contact placed on the gear box which changes logical state after passage to the highest gear ratio.

3-Logical information provided by a contact which works with the gas butterfly valve which changes logical state after reaching an opening in excess of a predetermined maximum.

The interface circuit according to the invention is realized, by way of example, starting with a logic circuit which uses AND gates at two inputs and the outputs of which feed the control circuits of the luminous indicator lights located on the dash board, provided which can be with brightness modulation circuits according to the use of the vehicle during the day or the night. The latter two circuits are also known and are described in the previous French application filed under the No. 79/02016 by the present applicant.

The advantage of the present invention is found in the combination of the various circuits, certain ones of which are known and, in particular, in the realization of the interface circuit whose role it is to establish the priorities of the information it receives. The information about the motor operating conditions has priority over that of the gas butterfly valve opening, and the information about the motor operating conditions is automatically canceled when the highest gear ratio speed range is engaged.

The driver is alerted to the other intermediate conditions by an indicator which lights up when the motor operating conditions are too high, such as indicating the need for a higher gear ratio.

In the same manner, another indicator signals the driver that the gas butterfly valve opening is too great and that he must, consequently let up on the gas pedal because he has been too "heavy footed".

The most economical operation is signaled by a third indicator which doesn't light up until the first two are out.

BRIEF DESCRIPTION OF THE DRAWINGS

Other details and advantages of the invention will become apparent from the text of the following description in reference to the attached drawing in which:

FIG. 1 is a functional schematic of the assembly of the device,

FIG. 2 shows the input circuit,

FIG. 3 shows the periodometer circuit with its associated, connected circuits,

DESCRIPTION OF THE PREFERRED EMBODIMENT

Figure 4:
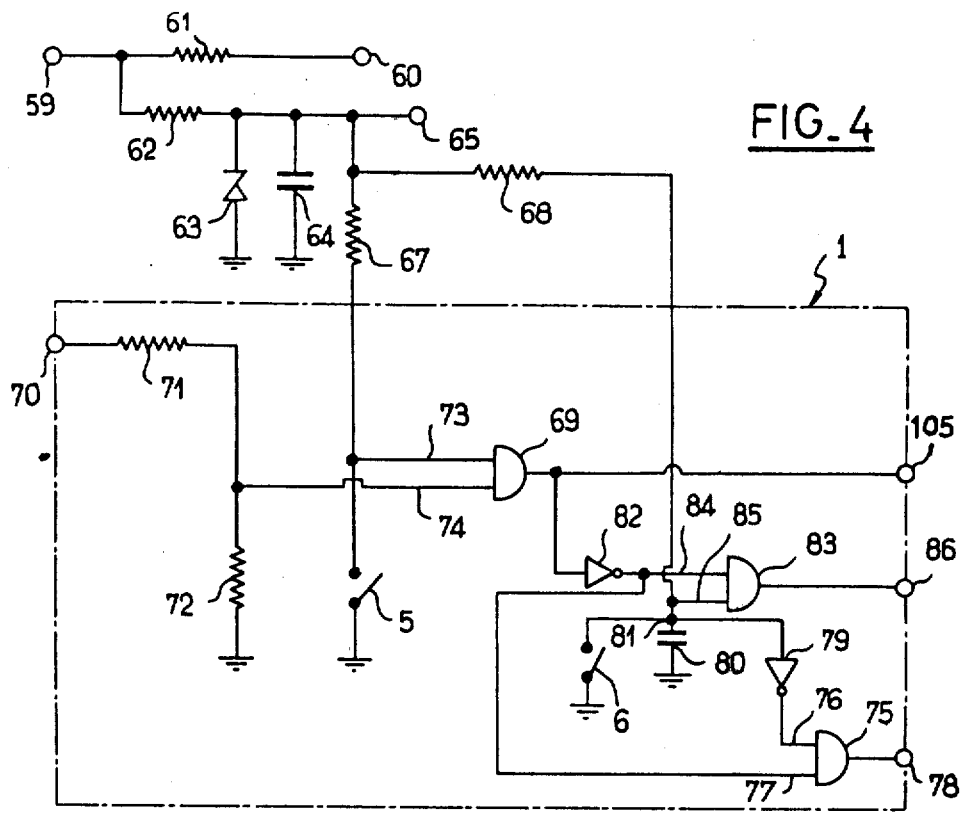
FIG. 4 shows the interface circuit and the supply circuit of the device.

The device shown in its assembled form in FIG. 1, in the form of functional blocks, comprises an interface circuit 1 which receives the three types of above-mentioned information, i.e. a first type of information regarding the operating conditions of the motor, that is regarding its rotation speed, derived from the primary ignition coil 2, then processed successively while passing through the input or forming circuit 3 and a periodometer 4 comprising its associated trigger (or threshold) circuits, of magnetic lag and memory; a second type of information regarding the gear ratio, conveyed by a contact 5 which is open at all intermediate signal levels and only closed at the highest gear ratio; a third type of information regarding the degree of opening of the gas butterfly valve, conveyed by another contact 6 which closes when the valve exceeds a predetermined maximum opening indicating excessive consumption. These types of information are processed in binary logical form in the interface circuit which establishes the priorities and delivers three output signals which activate the corresponding control and signal circuits 7.

The device is completed by a supply circuit 8 which is common with the other circuits.

The input circuit 3 shown in FIG. 2 is connected to input terminal 9 of the primary coil of the ignition coil 2. Positive supply is obtained by a resistance bridge divider 10, 11 leaving from terminal 12 to supply circuit 8. Diode 13 impedes the positive potential, obtained at the common point 14 of the resistors, from returning across the primary of the coil, while the diode 15 protects the assembly against strong negative currents which can build up in the coil. The signal then passes through a dual-celled base pass filter formed by resistors 16, 17 and condensors 18, 19 which make it possible to obtain a first formation of detectable impulses in the ignition coil 2. Then the signal passes through a "Schmitt trigger" circuit made up of two inverters 20, 21 and two resistors 22, 23 whose function is well known in the art.

This circuit is in fact a rectangular signal generator with positive and magnetic lag reactions which makes it possible to obtain a rectangular signal output at terminal 24 whose repetition frequency is equal to that of the signal present in the primary coil. The output signal is then shunted by condensor 25 and resistor 26, forming a differentiator circuit, the diode 27 does not allow anything to pass through the output terminal 28 except positive impulses correctly able to control the periodometer circuit 4.

The description of the periodometer and its detailed function along with that of its associated circuits shown in FIG. 3 are already described in the preceding application FR 79/19104. Thus the present description is limited to an identification of the elements of the circuit and a simplified description of their function.

The periodometer circuit or time comparison generator comprises resistors 29 to 33, condensor 34, thyristor 35, the programmable unijunction transistor 36 and diode 37.

The trigger generator comprises resistors 38, 39, 40 diode 41 and condensor 42.

The bistable trigger circuit comprises resistors 43 and 48 and the two NPN transistors 49 and 50.

The time comparison generator compares the period of the input signal at terminal 51, coming from output 28 of the forming circuit 3, for the duration of one reference period furnished by the trigger generator, while the bistable trigger circuit memorized the result of the comparison. Condensor 34 charges slowly across resistor 32 and discharges rapidly by two different routes: the first route is comprised of thyristor 35 which is released each time it receives a positive impulse arriving from the input 51, and a second route is comprised of the programmable unijunction transistor 36 which discharges (releases) when the charge on the condensor 34 reaches the starting charge furnished by the trigger generator and controlled by resistor 52 which constitutes the magnetic log control (hysteresis) of the assembly.

After the period on the input terminal 51 permits or does not permit the charge on the condensor 34 to attain the trigger level for transistor 35, an impulse appears at one or the other of resistors 31, 33 and is conveyed to one or the other of the control routes 53, 54 of the bistable trigger circuit which retains the result of the comparison in its memory until the following period. The junction of the trigger circuit is such that the transistor 50 remains blocked and the transistor 49 remains saturated when the signal period on terminal 51 is greaater than the reference signal period obtained when the charge tension on condensor 34 attains the starting trigger level of the unijunction transistor 36.

In sum, the voltage occurring at the output terminal 55 of the assembly has approached the positive supply voltage at terminal 56 and, therefore, at a high level when the period of the signal appearing on the primary coil of the ignition coil is lower than the reference period, i.e. when the motor operating conditions are too high.

In the opposing case, the voltage present at the output terminal 55 is at a low level and approaches an equal level with the ground.

The presence of a second positive supply line 57 whose voltage is stabilized by a Zener diode 58, assures the proper function of the circuit notwithstanding the normal fluctuations of voltage in the vehicle network.

The supply and protection circuit 8 in FIG. 1 is shown in detail in FIG. 4. The block 1 details the interface circuit according to the invention.

One input terminal 59 is connected to the positive supply circuit of the vehicle network, down circuit from the key which makes contact with the vehicle battery. Terminal 60, via the resistor 61, supplies terminal 57 of the periodometer circuit 4. A resistor 62 is also connected to terminal 59. This resistor 62, which is connected to Zener diode 63 and condensor 64, permits the discharge of a positive voltage filtered of all static interference which may originate at terminal 59 or at terminal 65, connected to terminal 56 of the periodometer. This positive voltage also supplies the other circuits cited in the present specification, particularly the forming circuit, through terminal 12, and the signal indicator control circuit, through terminal 66.

In addition the voltage at terminal 65 polarizes, across resistors 67, 68, the logic gates of the interface circuit described above. In the embodiment shown in FIG. 4, the interface circuit is composed essentially of three AND logic gates with two inputs. The first AND gate 69 receives at its first input 73, the signal given by the contact 5 of the gear ratio, the signal polarized by the positive voltage at the output of resistor 67, while the other terminal of the contact is connected to ground. The first input of gate 68 is, thus, at a high level when contact 5 is open, i.e. when any one of the intermediate gears is engaged. The second input 74 of the AND gate 69 receives the signal from output 55 of the periodometer which is applied to the terminal of input 70 of the interface circuit. This signal has its voltage returned to the correct level by means of the resistor divider bridge 71 and 72. The output 105 of the first AND gate is actuated by the command of the first signal indicator 106 which lights up when the logical state of the two inputs are at a high level, i.e. when the contact 5 is open (intermediate gear) and when the output of the periodometer 55 is at a high level (motor operating conditions too high). When the driver shifts to the highest gear, the contact 5 connects the first input 73 to ground and the indicator 106 goes out; the information about the motor operating conditions is then canceled, because the output 105 remains at the low level whatever the logical state at the other input 74.

A second AND logic gate 75 with two inputs 76, 77, controls with its output 78 a second indicator 109, of a different color, which signals the opening of the gas butterfly valve. This gate receives, at the first input 76, the signal generated by the contact 6 on the butterfly valve; the signal is polarized by the positive voltage at the output of resistor 68 of the supply circuit and inverted across logic invertor 79 before being applied at gate 75. The other terminal of contact 6 is connected to ground. A condensor 80, mounted in parallel on contact 6, has the function of eliminating the static interference due to the rebounding of the contact 6 in the course of its functioning. The first input 76 of the gate 75 is, thus, at a high level when the common point 81, up circuit from the throw over switch 79, is equal to the low level. This condition which exists when the contact 6 is closed, signifying that the gas bufferfly valve is open too far and that the consumption is excessive. The second input 77 of gate 75 is connected to the output 105 of the first gate 69 via an inverter 82. Thus, the second gate may only signal information about the opening of the gas butterfly valve when the second input 77 is at a high level and, thus, the output 105 of the first gate at a low level, i.e. when the contact 5 is closed (highest gear ratio). To the contrary, with intermediate gears, the second input of gate 75 is at a low level and the indicator 109 cannot light up; thus, there is a priority of information about the motor operating conditions in relation to the information about the opening of the butterfly, a priority which only exists with intermediate gears. In the highest gear the only information which remains is about the gas butterfly valve, since the driver is not able to react except within the parameters of reestablishing economical operation.

The economical operation indication is given by the output of a third AND logic gate 83 with two inputs 84, 85, whose output 86 controls a third indicator 87 of a different color than the other two. The first input 84 is connected to the output of the inverter 82 and, therefore, common with the input 77 of the second gate 75. The second input 85 is connected to a common point 81 at the output of contact 6 of the gas butterfly valve.

Under those conditions the economical operation indicator 87 only lights up when the contact 6 is open (reasonable butterfly opening) and when the motor operating conditions are not too high (low level at the second input 74 of the first gate 69).

Nonetheless, this later information is not taken into account and only has meaning for the intermediate gears (high level on the first input 73 of gate 69).

Figure 5:
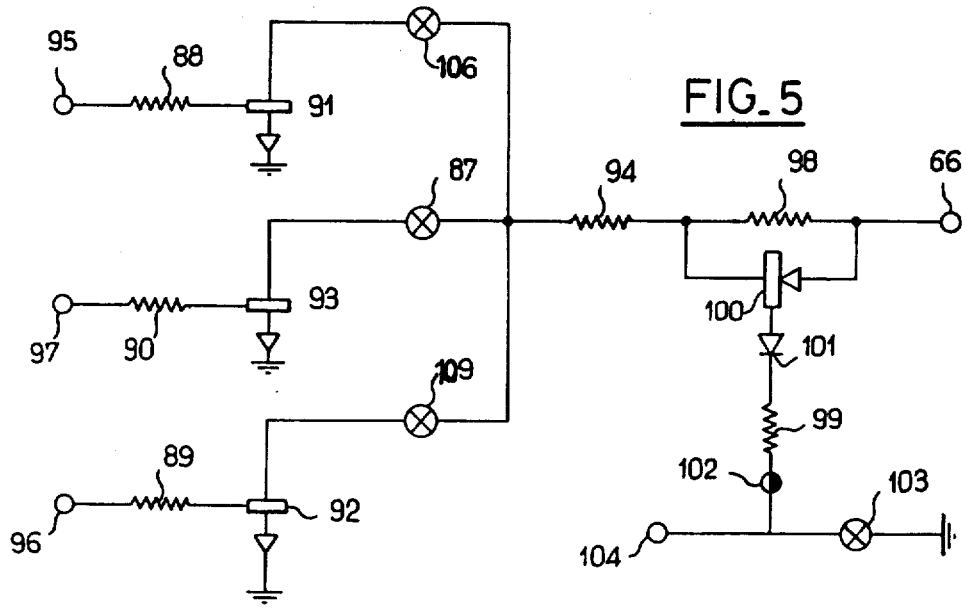
FIG. 5 shows the control circuits and the modulation circuits signal indicator brightness.

FIG. 5 shows the signal indicators 106, 109, 87 and their known control circuits made up of resistors 88, 89, 90 and NPN transistors 91, 92 and 93 respectively. Resistor 94 controls the current circulating in the indicator when functioning and may, at the most, have a zero value. The control circuits receive signals at their input terminals 95, 96, 97 from respective outputs 105, 78, 86 of the interface circuit. When the signal at any one of its input terminals is at a high level, the corresponding transistor becomes a conductor and allows the indicator to light up correspondingly across the day/night commutation circuit whose function is known and is briefly give hereinafter:

This circuit is made up of resistors 98, 99, PNP transistor 100 and diode 101. Ther terminal 66 receives its positive supply current and terminal 102 is connected to the positive supply line 104 of the vehicle running lights 103.

When the running leghts are out the base of transistor 100 is connected to the ground of the vehicle via diode 101 which is polarized in a direct sense by resistor 99 which limits the base current of transistor 100, and via the weak resistance produced by the filaments of the running lights 103. In this situation transistor 100 is a conductor and short circuits resistor 98. The indicator lamps are thus supplied at a voltage close to that of the supply terminal 66. When the terminal 104 is powered by the positive vehicle supply current (lighted running lights), diode 101 is polarized in the non-conductuve direction which blocks transistor 100. Then, resistor 98 is in series with the indicator and reduces its illumination to avoid blinding the driver at night.

I claim:

1. Carburant consumption indicator device for automobiles which monitors such information as the motor operating conditions, the reading of the selected gear ratio and the degree of gas butterfly valve opening, with said information being processed in an electronic interface circuit (1) in order to inform the driver by means of different dashboard mounted signal indicators of the economical operation of the vehicle wherein said interface circuit (1) comprises:

- a first AND logic gate (69) having an input (74) for receiving motor operation information and whose output (105) supples a first indicator (106) which lights up when the motor operating conditions exceed an authorized trigger maximum;
- a second AND logic gate (75) having a first input (77) for receiving the output of said first gate (69), and a second input (76) for receiving butterfly valve opening information and whose output (78) supplies a second indicator (109) which lights up when the butterfly valve opening exceeds an authorized trigger maximum; and
- a third AND logic gate (83) whose inputs (84, 85) are connected in parallel with those of the second gate and whose output (86) supplies a third indicator (87) which lights up when the motor operating conditions and the butterfly valve opening each remain below their respective trigger maximums.

2. Device according to claim 1, wherein the output of said first gate (69) is connected to inputs of said second and third gates (75, 83) by means of a first logical inverter (82) and wherein said butterfly valve opening information (6) is fed to said second gate (75) by means of a second inverter and is fed directly to said third gate (83).

3. Device according to claim 1, wherein said first gate (69) further receives gear ratio information by means of a gear ratio contact (5) placed on a gear box which contact closes when the reading is above a predetermined valve.

4. Device according to claim 1, wherein said butterfly valve opening information is produced by a valve contact (6) which closes above an authorized maximum opening.

5. Device according to claim 1, wherein said motor operating information is produced by a comparison of a input circuit (3) modified signal detected from a primary ignition coil (2), with a reference signal conveyed by a periodmeter.

* * * * *